No. 707,091. Patented Aug. 19, 1902.
T. A. DUTTON.
SUGAR CANE STRIPPER.
(Application filed Sept. 12, 1901.)
(No Model.)

Witnesses
Jno. [illegible]
Gladys L. Thompson

Inventor
T. A. Dutton

R.H.A.B. Lacey
Attorneys.

UNITED STATES PATENT OFFICE.

THOMAS A. DUTTON, OF EGYPT, GEORGIA.

SUGAR-CANE STRIPPER.

SPECIFICATION forming part of Letters Patent No. 707,091, dated August 19, 1902.

Application filed September 12, 1901. Serial No. 75,200. (No model.)

*To all whom it may concern:*

Be it known that I, THOMAS A. DUTTON, a citizen of the United States, residing at Egypt, in the county of Effingham and State of Georgia, have invented certain new and useful Improvements in Sugar-Cane Strippers; and I do hereby declare the following to be a full, clear, and exact description of the invention, such as will enable others skilled in the art to which it appertains to make and use the same.

This invention relates to an implement for stripping the blades from the stalks of sugar-cane and like plants, the device comprising a handle and forwardly-diverged stripping members having outwardly-curved parts intermediate of their ends in transverse alinement and sharpened to cutting edges, the members terminating in hooks for removal of the fodder and other matter from the roots of the stalks.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
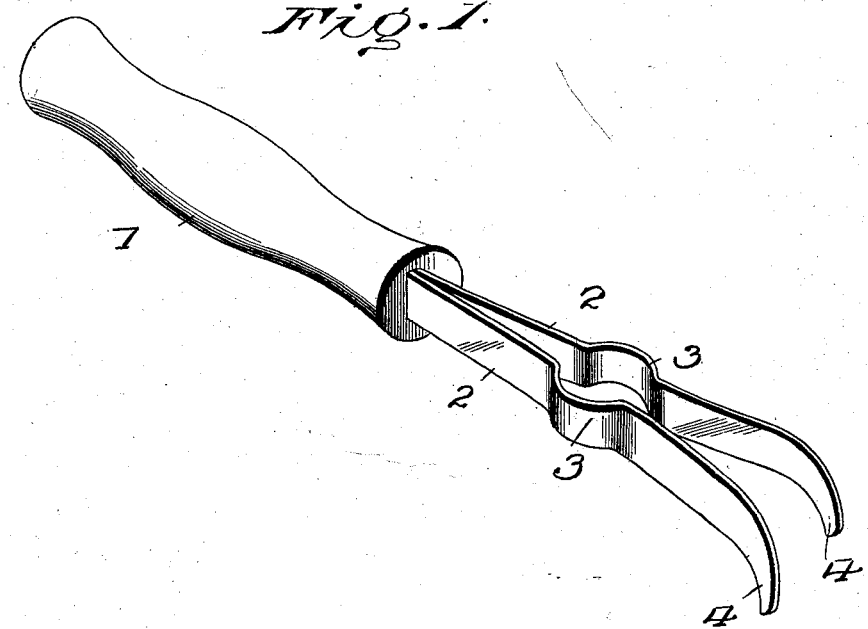
Figure 2:
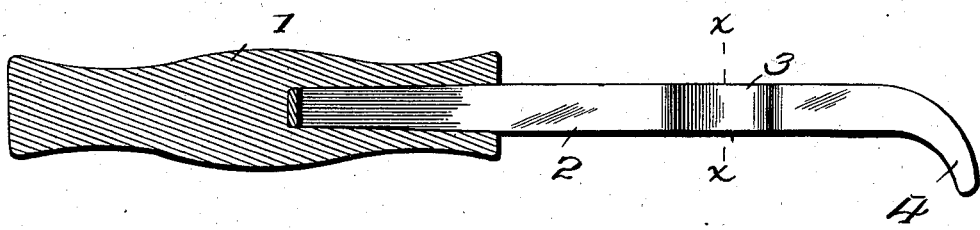
Figure 3:
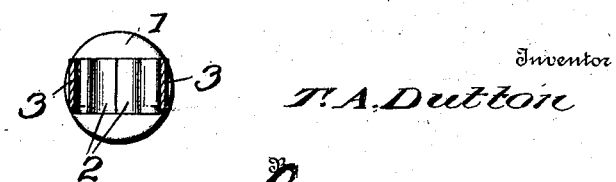

Figure 1 is a perspective view of an implement embodying the invention. Fig. 2 is a side view, the handle being in longitudinal section. Fig. 3 is a section about on the line X X of Fig. 2.

Corresponding and like parts are referred to in the following description and indicated in all the views of the drawings by the same reference characters.

The implement comprises a handle 1 and blades or members 2, secured to said handle and forwardly diverged and having outwardly-curved portions 3 intermediate of their ends and terminating in hooked grubbing-points 4. The blades 2 may be end portions of a strip folded upon itself or may consist of separate parts secured together at their inner ends in any substantial manner. The blades diverge toward their outer ends to admit of the stalk being readily received between them, said blades spreading as the stalk advances between them toward the outwardly-curved portions 3, when the blades automatically spring together and cause the parts 3 to encircle the stalk, which is stripped of all blades and lateral shoots by moving the implement thereon, as will be readily comprehended. The outwardly-curved parts 3 are in transverse alinement, and corresponding edges are sharpened to form cutters, whereby the stripping of the cane or other stalk is effected by movement of the implement thereon after being properly fitted to the stalk, the hooked terminals 4 constituting grubbing-point and enabling fodder and other matter to be removed from the roots of the cane or stalks. If desired, the blades 2 may be sharpened throughout their length; but this is not necessary, since the stripping is effected only by the outwardly-curved parts 3. The strip is folded sharp to bring the parts adjacent to the fold close together to form a shank or tang.

Having thus described the invention, what is claimed as new is—

1. A cane-stripping implement comprising a metal strip folded upon itself to form a shank or tang and having the folded portions outwardly diverged and terminating in hooked grubbing-points, and having portions intermediate of their ends oppositely curved, and having corresponding edges of the curved portions sharpened, substantially as described.

2. A cane-stripper consisting of a handle having an opening in one end, and a strip folded upon itself to form a shank or tang fitted in the opening of the handle, and having the folded portions outwardly diverged and terminating in hooked grubbing-points, and having portions intermediate of their ends oppositely curved, and having corresponding edges of the curved portions sharpened, substantially as specified.

In testimony whereof I affix my signature in presence of two witnesses.

THOMAS A. DUTTON.

Witnesses:
EDWARD D. WILSON,
EMMET S. COMSEY.